Nov. 19, 1957  H. FRIEDMAN  2,813,981
FIBER GAUGE FOR VERY SMALL STRANDS
Filed Sept. 14, 1954
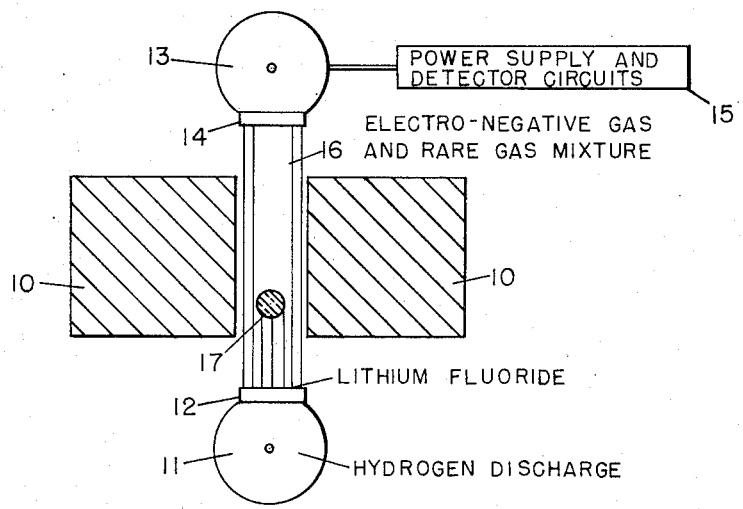
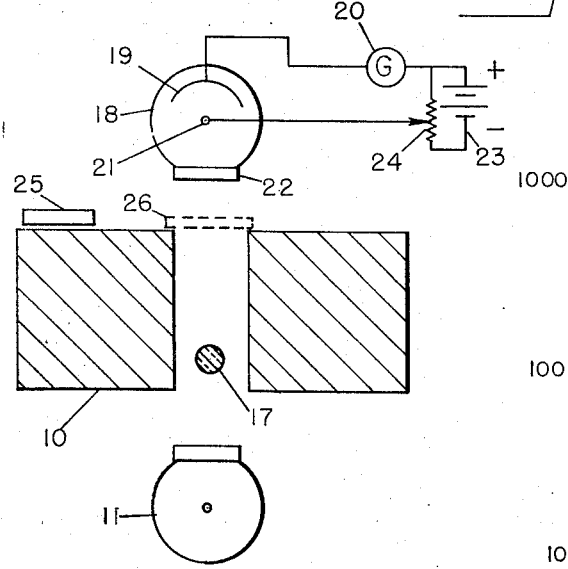
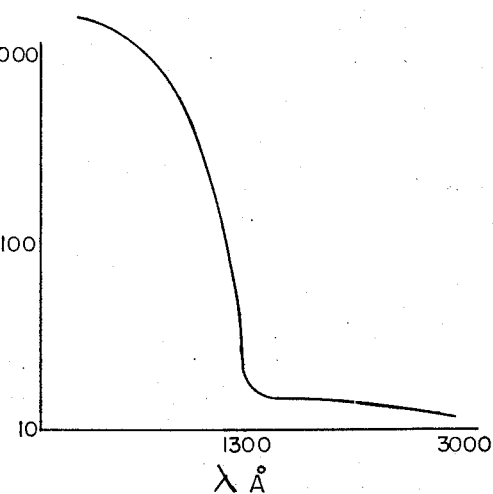
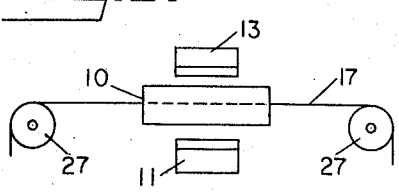
INVENTOR.
HERBERT FRIEDMAN

2,813,981

FIBER GAUGE FOR VERY SMALL STRANDS

Herbert Friedman, Arlington, Va., assignor, by mesne assignments, to J. J. Maguire, trading as J. J. Maguire Company, Washington, D. C.

Application September 14, 1954, Serial No. 455,886

17 Claims. (Cl. 250—83.6)

This invention relates to method and means useful in gauging fibers or moving strands and provides sensitivities which gauges strands smaller than 25 microns in diameter.

Fibers of nylon, rayon, Dacron and other synthetics are comparatively transparent to visible light. It is therefore difficult to measure the diameter of such fibers by means of optical systems employing visible light, especially where the fibers are less than 25 microns in diameter. Certain arrangements are known in the art for making measurements of this kind. One such arrangement is disclosed in my co-pending application for Method and Means for Gauging Fine Strands, Serial No. 434,152, filed June 3, 1954. In that application the absorption properties of the fiber and the air for alpha particle energy is utilized to obtain a high sensitivity gauging operation.

The present invention provides for gauging synthetic and other materials in the form of fine strands which are opaque to far ultraviolet radiation. By employing radiation sources of particular wavelengths and detectors therefor, accurate measurement of strand size can be obtained.

Accordingly it is an object of this invention to provide method and means for gauging the size of materials opaque to ultraviolet radiation.

A further object is to provide gauging at predetermined wavelengths.

These and other objects will be apparent from the following detailed description taken in conjunction with the accompanying drawing in which:

Fig. 1 is a schematic representation of the invention using a detector such as a photon counter;

Fig. 2 is a modification using a different detector;

Fig. 3 is a photosensitivity wavelength graph; and

Fig. 4 is a schematic view of an arrangement for gauging a moving strand.

The arrangement of Fig. 1 provides a hydrogen discharge tube 11 having a window 12 of lithium fluoride which is transparent to the Lyman α emission line of the hydrogen discharge. This line coincides with a narrow band of transparency of air at 1216 A. which permits the transmission of this wavelength through the air path to a photon detector 13. The high absorption by air of other than predetermined wavelengths in the ultraviolet region precludes their use in any satisfactory arrangement for gauging a fiber which is opaque to all ultraviolet wavelengths. However, certain well defined "windows" or narrow transmission bands which air exhibits, such as the 1216 A. window, provide the required conditions for sensitive gauging operations since the fibers are relatively opaque to all far ultraviolet wavelengths.

The detector tube 13 has a transparent window 14 of lithium fluoride and is sensitive to the 1216 A. line of hydrogen. One type of detector suitable for this purpose is the photon counter containing nitric oxide, chlorine, bromine or other electronegative admixtures with one or more of the rare gases. Detectors of this type may be energized from suitable power supply circuits 15 and the 1216 A. energy incident on the tube is detected by counting rate circuit 15 in a known manner.

Between the source 11 and the detector 13, a collimator slot 16 in metal block 10 is positioned to collimate the energy reaching the detector 13. In the slot 16 a fiber strand 17 or other article to be measured is placed. The strand 17 will generally extend longitudinally for considerable length while the source 11 and detector 13 may be somewhat extended in the direction of the length of the fiber 17 in the manner disclosed in the aforementioned co-pending application. Likewise the strand 17 may be transported in the slot 16 or in continuous longitudinal motion.

Because of the extremely high opacity of the fiber 17 to the far ultraviolet energy from the source 11, the shadow produced by the fiber 17 will be almost exactly equal to the width of the fiber. The resulting energization of the tube 13 will be in accordance with the ratio of the transverse areas of the fiber 17 and the slot 16 and a high sensitivity to variations in diameter of the strand 17 obtains in the counting rate detected by the circuits 15.

In Fig. 2 a modified detection apparatus is shown in which a conventional photocell 18 is used. The remainder of the gauging apparatus may be similar to that of Fig. 1 and comprises the 1216 A. source 11, collimator 10, and strand 17. The detector photocell 18 has a clean metal photocathode 19 and a conventional anode 21. The tube 18 is also provided with a window 22 for admitting the 1216 A. radiation. For detecting far ultraviolet radiation the tube 18 is operated with a retarding potential to obtain the threshold for the internal photoelectric effect for the metal of the cathode 19. Thus by means of a source 23 and potentiometer 24 the anode 21 can be operated at any desired negative potential with respect to the cathode 19.

The effect of the negative retarding potential applied to the anode 21 is to suppress surface photoelectric low energy electrons which result from energization of the cathode 19 by long wavelength radiation. As the magnitude of this negative potential increases electrons are suppressed for shorter wavelengths. To utilize the internal photoelectric effect the retarding potential is adjusted to a value which eliminates response to energy of wavelength longer than approximately 1300 A. Thus only shorter wavelength energy will be effective to produce current flow in the tube 18 and as shown by Fig. 3 the response due to internal photoelectric effect at these shorter wavelengths is of the order of 100 times the long wavelength response. The electron flow in the tube 18 is a measure of the level of energization of the cathode 19 by ultraviolet radiation of wavelength shorter than 1300 A. and may be detected by any suitable detector such as a sensitive galvanometer 20.

To adjust the potentiometer 24 to the desired level a suitable filter 25 may be moved to a position 26 in which the energy incident upon the cathode 19 first passes through the filter 25. If the filter 25 is of material, such as ordinary glass, which transmits visible light and other wavelengths longer than the desired far ultraviolet, but is opaque to the latter, the response due to those wavelengths transmitted through the filter 25 in position 26 can be eliminated by adjustment of the potentiometer 24. Upon removal of the filter 25 from position 26 the tube 18 will produce response to the higher wavelengths which now are not blocked by the presence of the filter 25. As with the embodiment of Fig. 1 the diameter of the strand 17 will be indicated by the relative response of the tube 18 as indicated on the detector 20.

In Fig. 4 an arrangement is shown in which the detector is disposed with respect to a strand 17 which is continuously transported by reeling means 27 through the collimator 10. The source 11 and detector 13 are disposed on opposite sides of the collimator block 10 in accordance with either of the embodiments of Fig. 1 or Fig. 2. With this arrangement the gauging operation can be conducted with respect to a moving strand 17.

Many modifications of the apparatus disclosed as the present preferred embodiments may be made without departing from the scope of the present invention defined by the appended claims.

I claim:

1. Apparatus for gauging a fine strand which is relatively opaque to ultraviolet radiation comprising a source of ultraviolet radiation of a wavelength to which air is transparent, a detector for said radiation, means for interposing said strand between said source and said detector to absorb a portion of the radiation incident upon said detector and means responsive to said detector in accordance with the incident radiation representative of the absorption of said strand.

2. Apparatus according to claim 1 in which said detector is a photon counter discharge tube containing an electro-negative gas.

3. Apparatus according to claim 2 in which said gas is an admixture of one of the rare gases and at least one selected from the group consisting of nitric oxide, chlorine and bromine.

4. Apparatus according to claim 1 in which said detector comprises a photocell having a clean metal surface photocathode operated in the neighborhood of the threshold for internal photoelectric effect with an applied retarding potential to eliminate long wavelength response.

5. Apparatus for gauging a fine strand which is relatively opaque to ultraviolet radiation comprising a hydrogen discharge tube for generating ultraviolet radiation in the region of 1216 A., a detector for said radiation, means for interposing said strand between said source and said detector to absorb a portion of the radiation incident upon said detector, and means responsive to said detector in accordance with the incident radiation representative of the absorption of said strand.

6. Apparatus according to claim 5 in which said detector is a photon counter discharge tube containing an electro-negative gas.

7. Apparatus according to claim 6 in which said gas is an admixture of one of the rare gases and at least one selected from the group consisting of nitric oxide, chlorine and bromine.

8. Apparatus according to claim 5 in which said detector comprises a photocell having a clean metal surface photocathode operated in the neighborhood of the threshold for internal photoelectric effect with an applied retarding potential to eliminate long wavelength response.

9. Apparatus for gauging a fine strand which is relatively opaque to far ultraviolet radiation comprising, an opaque block having a collimating opening therethrough, a source of ultraviolet radiation of a wavelength to which air is transparent, means positioning said block to collimate radiation from said source, a detector for said radiation positioned to receive energy emanating from said slot, means for introducing said strand to absorb energy passing through said opening, and means responsive to said detector in accordance with the incident radiation representative of absorption of said strand.

10. Apparatus according to claim 7 in which said means for introducing said strand includes means for moving said strand longitudinally.

11. The method of gauging fine strands which are relatively opaque to ultraviolet radiation comprising the steps of generating ultraviolet radiation of wavelength to which air is transparent, collimating a portion of said radiation, detecting said collimated radiation energy and interposing said strand to absorb a portion of said collimated energy.

12. The method according to claim 9 in which said radiation has a wavelength of approximately 1216 A. generated by a hydrogen discharge.

13. The method of gauging fine strands which are relatively opaque to ultraviolet radiation comprising the steps of generating ultraviolet radiation of wavelength to which air is transparent, detecting the relative magnitude of said radiation energy and interposing said strand to absorb a portion of said energy incident upon the detector.

14. The method according to claim 13 in which said radiation has a wavelength of approximately 1216 A. generated by a hydrogen discharge.

15. Apparatus for gauging a fine strand which is relatively opaque to ultra-violet radiation comprising a source of ultra-violet radiation of a wave length to which air is transparent, a detector for said radiation including an ionizable gas-filled tube having a portion of the envelope transparent to said radiation whereby ultra-violet radiation passing through said transparent portion ionizes the gas within said tube, means for interposing said strand between said source and said detector to absorb a portion of the radiation incident upon said detector and means responsive to said detector in accordance with the incident radiation representative of the absorption of said strand.

16. Apparatus according to claim 15 in which said tube contains an electro-negative gas.

17. Apparatus according to claim 16 in which said gas is an admixture of one of the rare gases and at least one gas selected from the group consisting of nitric oxide, chlorine and bromine.

References Cited in the file of this patent

UNITED STATES PATENTS

| | | |
|---|---|---|
| 2,229,489 | Barnard | Jan. 21, 1941 |
| 2,413,486 | Denyssen | Dec. 31, 1946 |
| 2,593,206 | Short | Apr. 15, 1952 |